US009092685B2

(12) United States Patent (10) Patent No.: US 9,092,685 B2
Poole (45) Date of Patent: Jul. 28, 2015

(54) METHOD AND SYSTEM FOR RFID LABEL REPLACEMENT OF CONVENTIONAL LABELS ON MEDIA IN A MEDIA STORAGE SYSTEM

(71) Applicant: Recall Technology Pty Limited, Norcross, GA (US)

(72) Inventor: Jonathan Poole, Lawrenceville, GA (US)

(73) Assignee: Recall Technology PTY Limited, Sydney (AU)

( * ) Notice: Subject to any disclaimer, the term of this patent is extended or adjusted under 35 U.S.C. 154(b) by 159 days.

(21) Appl. No.: 13/896,552

(22) Filed: May 17, 2013

(65) Prior Publication Data

US 2013/0248592 A1 Sep. 26, 2013

Related U.S. Application Data

(62) Division of application No. 13/173,735, filed on Jun. 30, 2011, now Pat. No. 8,496,165.

(51) Int. Cl.
*G06F 17/00* (2006.01)
*G06K 1/14* (2006.01)
*G06K 1/18* (2006.01)
*G06K 17/00* (2006.01)
*B65C 9/00* (2006.01)
*B65C 9/40* (2006.01)

(52) U.S. Cl.
CPC .. *G06K 1/14* (2013.01); *G06K 1/18* (2013.01); *G06K 17/00* (2013.01); *G06K 17/0025* (2013.01); *B65C 2009/0003* (2013.01); *B65C 2009/408* (2013.01); *G06K 2017/0083* (2013.01)

(58) Field of Classification Search
CPC ................ B65C 2009/0003; B65C 2009/405; B65C 2009/408; G06K 19/08; G06K 2017/0045; G06K 2017/0083; G06K 17/0025; G05B 19/4183
USPC ......... 235/492, 451, 454, 439, 440, 375, 385, 235/462.1, 462.11; 340/572.1, 10.1
See application file for complete search history.

(56) References Cited

U.S. PATENT DOCUMENTS

| 4,512,092 A | 4/1985 | McLaughlin et al. |
| 7,416,121 B2 * | 8/2008 | Zimmerman ................. 235/385 |
| 7,857,221 B2 | 12/2010 | Kuhno et al. |
| 2004/0134620 A1 | 7/2004 | Soeborg |

(Continued)

OTHER PUBLICATIONS

Grob, Mark "PCT Search Report", PCT/US2012/040870; Filed Jun. 8, 2012; Mailed Nov. 8, 2012.

(Continued)

*Primary Examiner* — Michael G Lee
*Assistant Examiner* — Suezu Ellis
(74) *Attorney, Agent, or Firm* — Philip H. Burrus, IV

(57) ABSTRACT

A cart includes a scanning device, a control device, and an RFID label printer for replacement of non-RFID labels with RFID labels without the risk of misplacing media items or mislabeling the same. The scanning device scans, information from a non-RFID label, e.g., a bar code label, attached to one of the media items and delivers scanned data to the control device. The control device then creates, with the RFID label printer, a unique encoded RFID label corresponding to the non-RFID label scanned by the scanning device. The unique encoded RFID label can include a data field having a cart identifier to which the scanning device and the RFID label printer are attached and a serial number.

13 Claims, 18 Drawing Sheets

(56) References Cited

U.S. PATENT DOCUMENTS

| | | |
|---|---|---|
| 2004/0257203 A1* | 12/2004 | Maltsev et al. .............. 340/10.1 |
| 2005/0182777 A1 | 8/2005 | Block et al. |
| 2005/0230479 A1 | 10/2005 | Chapman et al. |
| 2007/0295447 A1 | 12/2007 | Symens et al. |
| 2008/0122623 A1 | 5/2008 | Hause |
| 2008/0219752 A1 | 9/2008 | Ruble |
| 2008/0297310 A1 | 12/2008 | Onderko |
| 2010/0102969 A1 | 4/2010 | Svalesen |
| 2011/0000971 A1 | 1/2011 | Onderko |
| 2011/0231004 A1 | 9/2011 | Henry |
| 2011/0282476 A1 | 11/2011 | Hegemier et al. |
| 2013/0048711 A1 | 2/2013 | Burns et al. |

OTHER PUBLICATIONS

Ellis, Suezu "Ex Parte Quayle Response", U.S. Appl. No. 13/173,735, filed Jun. 30, 2011; Mailed Jan. 16, 2013.

Ellis, Suezu "Notice of Allowance", U.S. Appl. No. 13/173,735, filed Jun. 30, 2011; Mailed Apr. 30, 2013.

* cited by examiner

FIG. 16

METHOD AND SYSTEM FOR RFID LABEL REPLACEMENT OF CONVENTIONAL LABELS ON MEDIA IN A MEDIA STORAGE SYSTEM

CROSS REFERENCE TO PRIOR APPLICATIONS

This application is a divisional application of U.S. Ser. No. 13/173,735, filed Jun. 30, 3011, which is incorporated by reference for all purposes.

BACKGROUND

1. Technical Field

This invention relates generally to processes related to media storage and archive, and more particularly to a radio frequency identification process for media storage and archive.

2. Background Art

Media items, such as magnetic tapes, disks, documents, folders, boxes, and so forth, are routinely sent to storage facilities for archival. For example, a business or individual may have records that need to be stored, but may not have the necessary storage space in which to archive the items themselves. They may thus enlist a media archival company, who in turn receives the media items, stores them, and returns them to the business or individual on demand.

In traditional media archival systems, a person is responsible for "checking in" items to be archived. The person identifies the item, records a notation of the item in the log, and sends the item to be stored. A storage team may update the log by denoting the storage location once the item has been archived. When a business or individual wishes to retrieve the item, the log is consulted to find out where the item is stored. It can then be retrieved appropriately.

A problem associated with media archival occurs when a particular item is lost. Loss can be due to a variety of reasons—data entry error in the log when the item is received, storage in the wrong place, improper storage location denotation in the log, accidental movement within the storage facility, and so forth. Where critical business data was disposed on a lost item, the loss can result in thousands of dollars or hundreds of man-hours attempting to reclaim the critical business data.

It would be advantageous to have an improved archival system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 11-16 illustrate apparatus components performing a method of auditing a media archival system in accordance with one or more embodiments of the invention.

Figure 1:
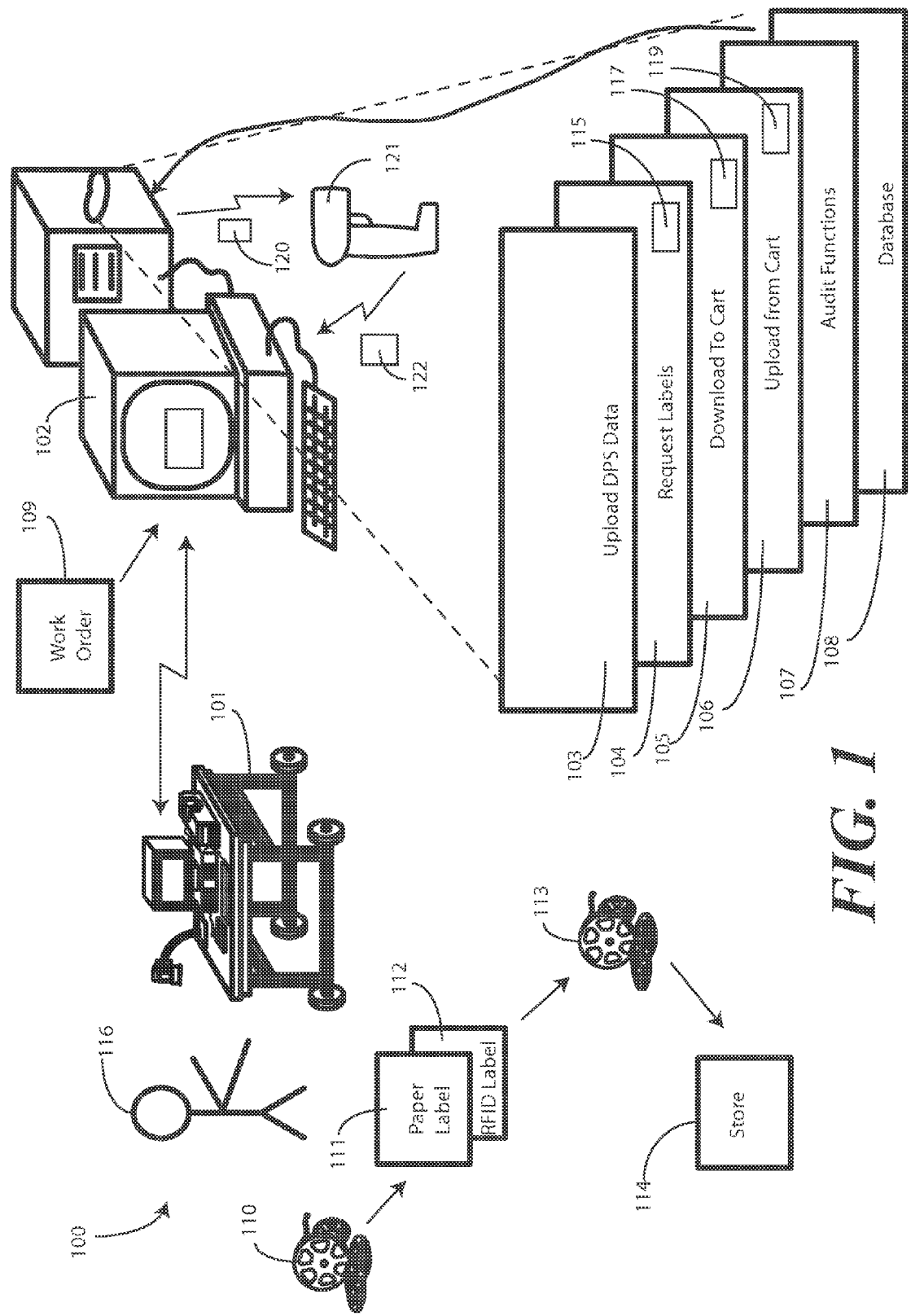
FIG. 1 illustrates a system, configured in accordance with one or more embodiments of the invention, suitable for use in a media archival system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to media archival of media items, and in one or more embodiments replacement of a bar code label with a RFID label during archival. Any process descriptions or blocks in flow charts should be understood as representing modules, segments, or portions of code, which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of label replacement and/or media item archival as described herein. The non-processor circuits may include, but are not limited to, a computer or other processing device, one or more internal or external memory devices, a communication link, such as radio transmitter or wired communication link, signal drivers, clock circuits, power source circuits, and user input devices. As such, these functions may be interpreted as steps of a method to perform label replacement and/or media item archival. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention describe methods and apparatus components for archiving media items. For illustration purposes, magnetic tape media will be used as an example of a media item. However, it will be clear to those of ordinary skill in the art having the benefit of this disclosure that the methods and apparatus components could be applied to other media items, including books, folders, containers, documents, and the like.

Many entities label media items with bar code labels. The bar code label information, when read by a scanner, can be used to cross reference databases to determine the contents of the media, when it was created, who created it, and so forth. The problem associated with bar code labels is that an optical reader must be able to "look at" the bar code to scan it. Where the media item is a magnetic tape being stored on a shelf, this requires a person to remove the item from the shelf, turn it so that the bar code label can be seen by the reader, scan the bar code, and then replace the item on the shelf. For an entity that stores only a small number of items, this process may not be time consuming. However, in a media archival entity, where hundreds of thousands of items are stored, this process is not only cumbersome and time consuming, but it can be completely cost prohibitive.

Radio Frequency Identification (RFID) labels can be advantageously used in media archival systems because they can be read without taking the item off the shelf. Accordingly, the labels of the hundreds of thousands of items can be read simply by passing a RFID reader past each item, regardless of orientation, thereby eliminating the need to physically remove each item from its storage location. Experimental testing has shown that the use of RFID labels on media items can not only save a media archival entity cost, but can also result in increased efficiency, reduced lost items, quicker location of items, and more reliable identification of items.

The problem is that most entities do not use RFID labels when labeling media items. Moreover, many entities are highly reluctant to permit their bar code labels to be replaced with RFID labels. The reason for this reluctance is simple. If a properly applied bar code label is removed, unless an RFID label with exactly corresponding data is applied, the data on the item is lost—forever. This is best explained by example. Presume a person has ten media items disposed along a table, with each needing to have a bar code label removed and a corresponding RFID label placed in its stead. Now presume the person removes the bar code labels and prints ten RFID labels. If the table is bumped just enough that two media items fall to the floor, there is a high probability that the identity of the data on those items is lost forever. This is due to the fact that media items are extremely vulnerable when their labels are removed. If a wrong label is applied, and that item is stored with hundreds of thousands of other items in a storage facility, the probability of reclaiming that item at a later date is small.

Embodiments of the present invention provide a cart and corresponding control system, that when used in accordance with the methods described herein, assure that the re-labeling process occurs in a systematic manner that ensures media items cannot be mislabeled. Numerous checks and redundancies are embedded in the methods to prevent mislabeling of media items. Additionally, the configuration of the cart is such that mislabeling cannot occur. Embodiments of the invention have sufficient reliability that they can be used to dispel the reluctancies of entities to allow re-labeling, thereby resulting in decreased media archival costs and increased reclamation abilities.

Turning now to FIG. 1, illustrated therein is one system 100 configured for replacement of labels on media items with RFID labels for storage in a media item archival system. In one embodiment, the system 100 includes a cart 101 and a control system 102. The cart 101 is configured to be portable so as to be taken, as needed, to media items that are ready for archival. The control system 102 is configured, in one embodiment, to execute the steps of a method for controlling the cart 101 during the label replacement and archival process.

The control system 102, which in one embodiment is a computer platform, server, or other control device executing operable code, comprises a plurality of modules 103,104,105, 106,107 that are operable on the computer platform to assist in the label replacement and archival process. For example, a data upload module 103 is used to create a customer upload profile for the control system 102. In one embodiment, each customer is assigned a unique customer identifier. During an archival process, scanned data from media items can be associated with the unique customer identifier in the control system 102. This association permits the control system 102 to know which media items belong to which client. The customer information added to the customer upload profile by the data upload module can include customer name, address, contact information, and so forth. The customer information can reside in a print results table as will be described below.

A request labels module 104 is configured, in one embodiment, to permit selection of a customer and cart when a work order 109 is received. When a customer wishes to archive a plurality of media items 110, in one embodiment the customer will deliver a work order 109 to the control system 102. The work order 109 includes the customer's identity, the number of media items to be archived, and identifiers corresponding to each of the media items. The work order 109 can include other customer or media item information as well.

In one embodiment, the media items 110 are each labeled with a non-RFID label 111. Examples of non-RFID labels 111 include hand-written labels, bar code labels, machine printed labels, and so forth. As noted above, in one or more embodiments, the non-RFID label 111 on each media item is to be replaced with a RFID label 112. This replacement, in one embodiment, occurs on a one-to-one basis by removing the non-RFID label 111 and immediately applying the RFID label 112 to create RFID-readable media items 113. The RFID-readable media items 113 can then easily be identified by a handheld or other scanner while in storage 114.

Upon receipt of the work order 109, a cart 101 is dispatched to read the non-RFID labels 111 and print the corresponding RFID labels 112. The request labels module 104 of the control system 102 facilitates the cart's dispatch. Using the request labels module 104, a system operator first selects a customer corresponding to the work order 109. The system operator then uses the request labels module 104 to select a cart 101. Many carts can be operable within the system 100, and each cart 101 is assigned a unique cart identifier. By using the request labels module 104, a customer identifier can be associated with a cart identifier prior to the RFID labels being printed.

A cart download module 105 then creates a download file 115 that will be eventually sent to a control device attached to the cart 101. In one embodiment, the download file 115 can be presented according to client identifier and cart identifier. In one embodiment, the download file 115 is a comma separated values file that includes a plurality of fields. An example of a field can include a plurality of allowed print values from which the control device attached to the cart 101 can select for assignment to the RFID labels 112. The client identifier, cart identifier, and other information can also be included in the download file 115. In one embodiment, the download file 115 also includes a desired set of print values that are based upon the work order 109. For example, if client A has 1000 media items to archive, as indicated on the work order 109, a particular cart 101 may have 10,000 print values that it could print. However, only 1000 should be printed in accordance with the work order 109. Accordingly, the allowed print values would be 10,000 in number, but the desired print values would be 1000 in number. This will be explained in further detail below when screen shots from each of the modules 103,104,105,106,107 are described.

In one embodiment, the control system 102 creates the allowed print values based upon the client selection and an available amount of labels present on the cart 101. For example, in one embodiment, each cart 101 has a capacity of printing 10,000 RFID labels 112. Once this quantity of RFID labels 112 is printed, the unique identifier for the cart 101 will be retired, and a new unique cart identifier will be assigned. Further, a particular customer may have previously stored media items, and may prefer to have each media item labeled sequentially. Accordingly, the allowed print values may be based upon information such as the remaining allotment of labels within the cart and/or the next sequential number for a particular customer.

Once the download file 115 is created, the cart download module 105 transmits the download file 115 to a control device operable on the cart 101. This transmission can occur over a variety of interfaces, including wireless, wired, optical, or other communication interfaces.

An operator 116 then takes the cart 101 and reads the non-RFID labels 111 from each of the client's media items 110. Corresponding RFID labels 112 are printed from the cart 101. The operator 116, or a machine configured to perform the removal-attachment operation, removes the non-RFID labels 111 and replaces them with the corresponding RFID labels 112. This read-print-remove-apply process occurs on a one-by-one basis such that the operator 116 or machine handles only a single media item at a time. The one-by-one basis prevents accidental loss of media items or mislabeling as only one item is handled at a time. The resulting RFID-readable media items 113 can then be stored in storage 114.

Once the cart activities are complete, a cart upload module 106 is configured to receive via the communications link an upload file 117 from the cart 101. The upload file 117 is then processed by the control system 102 to integrate the data therein into the system, such as by storing the data in a database 108.

The upload file 117, or data therefrom, can then be presented to the system operator in a print results table 118. In one embodiment, the print results table 118 includes a plurality of fields. A database key can be included in the print results table 118 for sorting the various fields of the upload file 118 as they relate to data stored in the database 108. A client number can be included in the print results table 118 for identifying the client to whom the RFID-readable media items 113 belong. A tape volume serial number can be included in the print results table 118 to store a customer identifier corresponding to the media items found in the work order 109. A media type identifier can be included in the print results table 118 to identify the type of media being stored, e.g., magnetic tape, document, book, etc. A regional identifier can be included in the print results table 118 to denote in what region of the world the media items are being stored. An RFID_Date field can be included in the print results table 118 to identify when the upload file 118 was created. The cart identifier can be included in the print results table 118 to identify which cart 101 printed the RFID labels 112. A print date can be included with the print results table 118 to identify when the upload file 117 was created. An applied date field can be included in the print results table 118 to identify when the RFID label 112 was printed. A roll number field can be included in the print results table 118 to indicate which roll of tags was used in the cart 101 to print the RFID labels 112. A serial number can be included in the print results table 118 to provide a sequential identifier for all of the RFID-readable media items 113. In one embodiment, each line item of the print results table 118 has associated therewith a unique nine-digit identifier that is a combination of the cart identifier and the serial number. The print results table 118 can also include a print code that identifies print failure, success, or other issue. It will be clear to those of ordinary skill in the art having the benefit of this disclosure that other fields can be included in the print results table 118 as well.

In one or more embodiments, it can be beneficial to audit stored media items. Where this is the case, an audit module 107 is configured to facilitate the audit by creating an audit file 119. The audit file 119 includes a plurality of identifiers corresponding to stored media items. In one embodiment, each identifier of the audit file 119 includes customer indicia identifying a customer, media type indicia identifying a type of media item to be audited, and location indicia indicating a storage location within the media item archival system. Once created, the audit module 107 uploads the audit file 119 to the control system 102. In one embodiment, the audit module 107 can then associate each identifier from the audit file 119 with a data field stored in the database 108 that is also printed on an RFID label 112 of a single media item in storage 114 to form a search file 120.

Once this is complete, the audit module 107 can download a search file 120 from the control system 102 into a portable scanner 121, which can be used to scan the RFID-readable media items 113 to ensure each is stored in accordance with the data in the audit file 119. Once this scanning is complete, the audit module 107 can receive a scan file 122 and upload it into the control system 102 from the portable scanner 121. In one embodiment, the scan file 122 can be used to indicate whether each item listed in the audit file 119 was found in the media item archival system in accordance with the data stored in the database 108. While the description above outlines the operation of the system, the operation of the cart 101 and modules 103,104,105,106,107 will become clearer in the discussion of the figures that follow.

Figure 2:
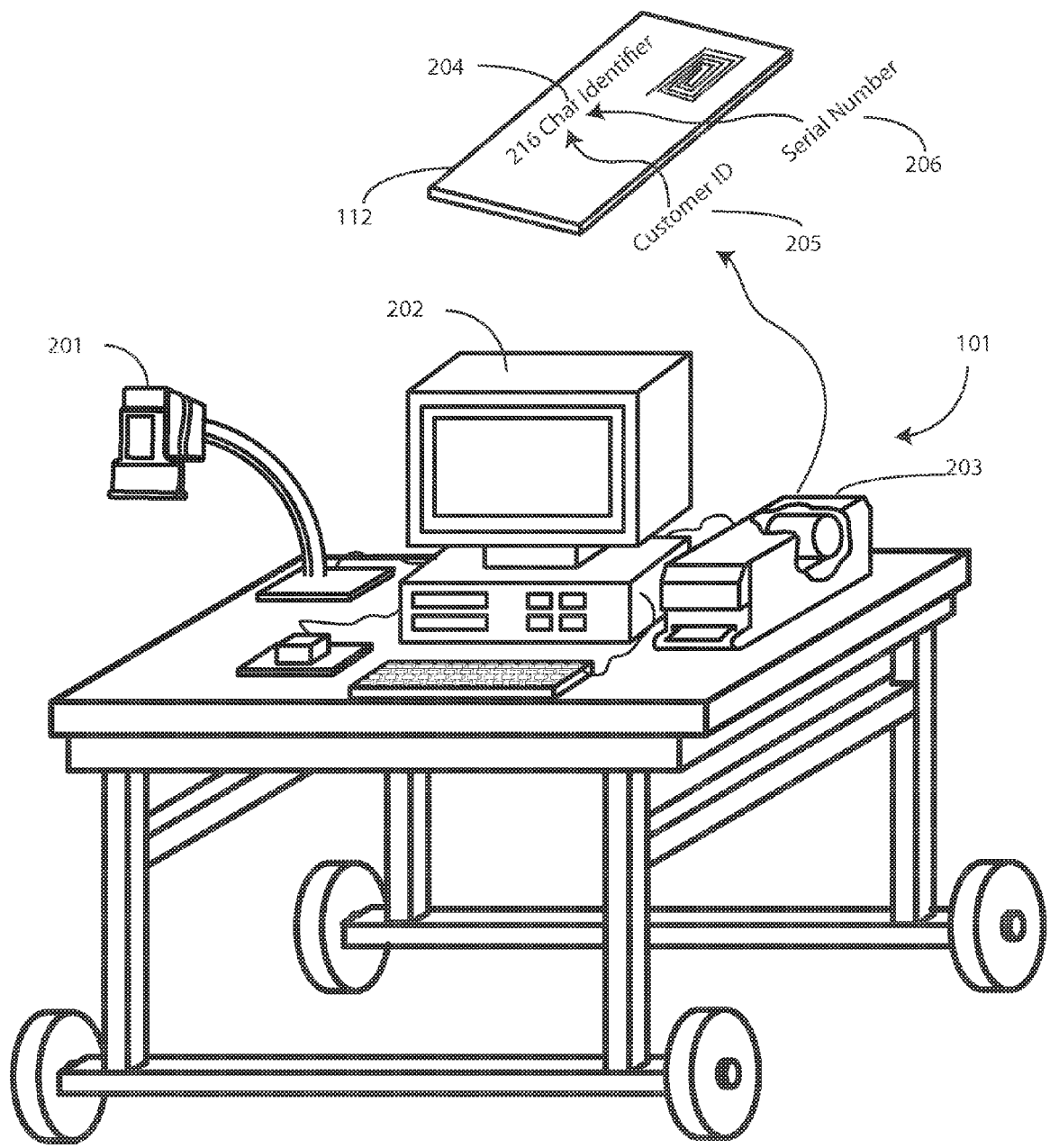
FIG. 2 illustrates one example of a cart configured in accordance with one or more embodiments of the invention.

Turning now to FIG. 2, illustrated therein is one example of a cart 101 configured in accordance with one or more embodiments of the invention. The illustrative cart 101 of FIG. 2 includes a scanning device 201, a control device 202, and a printer, which is illustratively shown in FIG. 2 as an RFID label printer 203. Other components can be included in the cart as well, such as power supplies or battery back up systems for the scanning device 201, control device 202, and RFID label printer 203. Where the control device 202 is configured for wireless communication with the control system (102), a near field transceiver can be included. In one embodiment, the cart 101 can be configured to be self-powered, with motor and steering mechanisms.

In one or more embodiments, the scanning device 201, control device 202, and RFID label printer 203 can be arranged so as to facilitate a predetermined sequence of operations for replacing non-RFID labels (111) with RFID labels 112 as described herein. For example, in FIG. 2, the scanning device 201 is disposed to the left of the control device 202, while the RFID label printer 203 is disposed on the right of the control device 202. In another embodiment, the scanning device 201 is disposed on a shelf or other platform beneath the control device 202. This particular arrangement indicates that the first step of the label replacement process is scanning the non-RFID label (111).

In one or more embodiments, each of the scanning device 201, the control device 202, and the RFID label printer 203 are fixedly attached to the cart 101. The fixed attachment serves multiple purposes. First, it helps ensure that these components will not be damaged when the cart is moved. Second, where the components are arranged in accordance with a predetermined sequence of label replacement operations, it ensures that the components will not be rearranged.

The scanning device 201 is configured, in one embodiment, to be able to read both non-RFID labels (111), such as conventional bar code labels, and RFID labels 112. Accordingly, in one or more embodiments, the scanning device 201 comprises two scanning devices: a first device being a laser scanner configured to read non-RFID labels (111) such as bar code and other labels, and a second device being an RFID scanner configured to read, write, verify, lock (or combinations thereof) RFID labels 112. By having such a scanning device 201, the same device can be used before and after the label replacement process. In another embodiment, the scanning device 201 can be an integrated, single device that is able to read both non-RFID labels (111) and RFID labels 112. For simplicity of illustration, the single scanning device 201 in FIG. 2 should be understood to cover either embodiment. The scanning device 201, be it multiple scanning devices or a singular, integrated scanning device, can be stationary and affixed to the cart 101, but can also be a handheld device that is fixedly tethered to the cart 101. One example of a suitable scanning device 201 is the an RFID scanner manufactured by ATID of South Korea.

The control device 202 is the processing system that is operable with the scanning device 201 and the RFID label printer 203. The control device 202 serves as the "brain" of the cart 101 and controls the various functions. The control device 202 receives scanned data input from the scanning device 201 and delivers information to the RFID label printer 203 for printing on the RFID labels 112. In one embodiment, the control device 202 is a computer executing operational code. One example of a computer suitable for use as the control device 202 is an IBM-compatible personal computer running a Windows-based operating system. As noted above, during the label replacement process, the control device 202 receives a download file (115) from the cart download module (105) of the control system (102). In one embodiment, the download file (115) includes a list of desired print values for the RFID labels 112.

The printer of FIG. 2 is illustratively shown as being an RFID label printer 203 configured to print the RFID-labels. However, it should be noted that the printer could also be an ordinary printer not having RFID capabilities. For example, the printer could be a simply laser printer configured to print ordinary labels. In such an embodiment, the printer could print to an RFID label 112, with a separate RFID device being included with the cart 200 and configured to write RFID information to the RFID label 112. Thus, RFID label printer 203 should be understood to include either a printer having RFID write capabilities or a conventional printer and RFID write device in combination. One example of a RFID label printer 203 suitable for use with the cart 101 is an RFID label printer manufactured by Printronix of Irvine, Calif. When a conventional printer is used, one example suitable for use with embodiments of the invention is manufactured by Primera Technology, Inc., of Plymouth, Minn.

In operation, the scanning device 201 first scans the non-RFID label (111) from each of the media items to be archived or stored. The scanned data from the non-RFID label (111) is then delivered to the control device 202. The control device 202 then delivers a data field 204 to the RFID-label printer 203 to be applied to the RFID label 112 to form a uniquely encoded RFID label. In one embodiment, the data field 204 is a 216-character field.

In one embodiment, the data field 204 is segmented into a plurality of fields. One or more of the fields can be configured in accordance with a standard, such as the IBM LTO Ultrium Cartridge Label Specification, Revision 6, Part Number 19P0034, EC-M10321, Published February, 2009, which is incorporated herein by reference. One or more of the fields can be configured to provide an indication of the cart and media item serial number as well. For example, in one illustrative embodiment, six fields of the data field 204 are defined by the IBM LTO Ultrium Cartridge Label Specification. These fields include a header field, a manager number, an object class field, a sub vendor number, a date and a volser. A seventh field can be defined to indicate both the cart responsible for printing the RFID label 112 and a serial number corresponding to the particular RFID label 112. Accordingly, in one embodiment, the seventh field comprises both the cart identifier 205 and a serial number 206. In one embodiment, the serial number 206 is selected from the desired print values of the download file (115). In one embodiment, the seventh field is 28 bits in length, with the cart identifier 205 being three characters in length and the serial number 206 being six characters in length.

Turning now to FIGS. 3-6, illustrated therein are method steps for controlling a cart (101) configured for label replacement in a media item archival system configured in accordance with one or more embodiments of the invention. Each of FIGS. 3-6 illustrates a screen shot of the control system 102, as produced by the various modules (103,104,105,106, 107) introduced in the discussion of FIG. 1.

Figure 3:
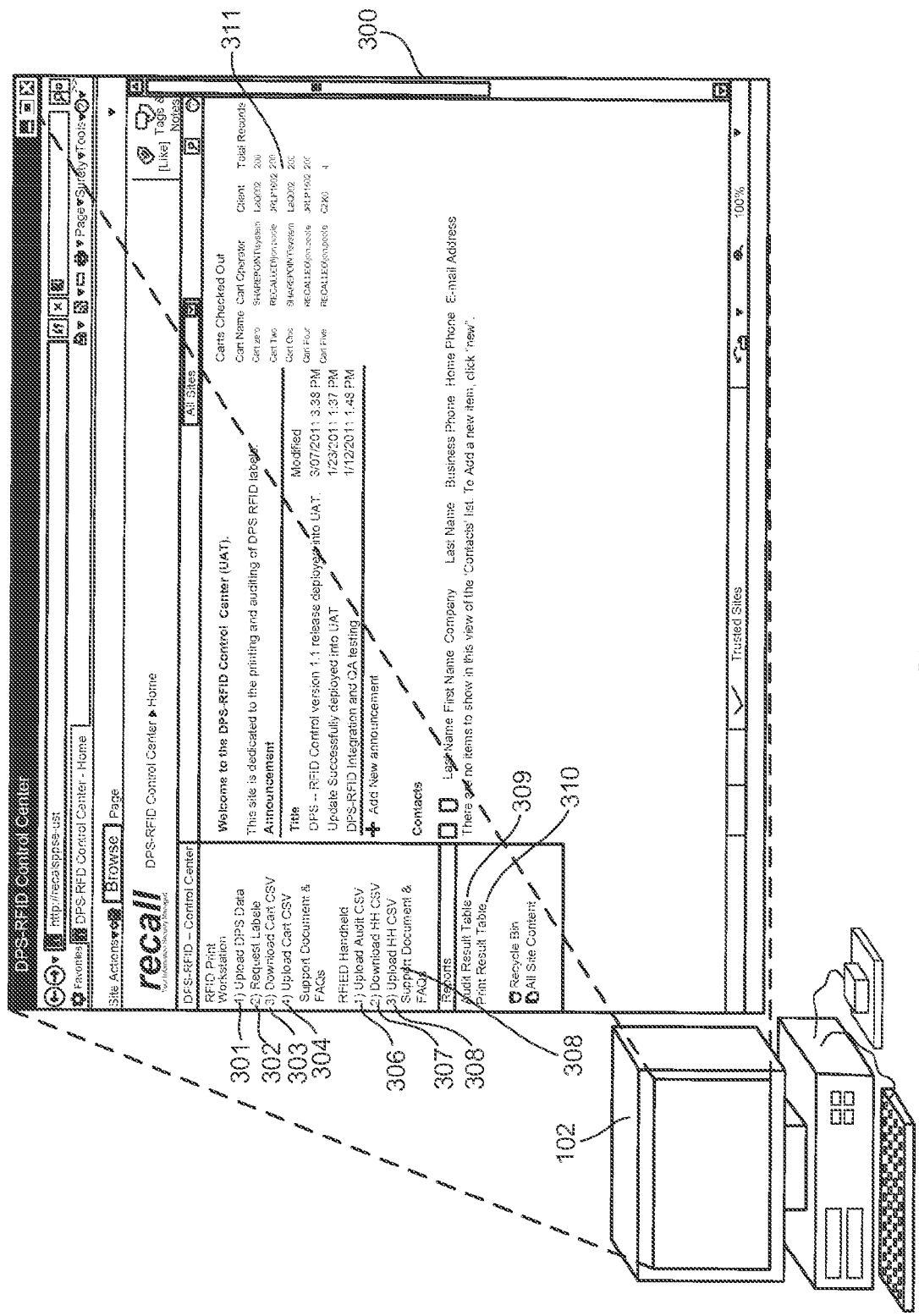
FIGS. 3-7 illustrate apparatus components performing illustrative steps of a method of controlling a cart configured for label replacement in a media item archival system in accordance with one or more embodiments of the invention.

Beginning with FIG. 3, illustrated therein is a dashboard 300 of the control system 102. The dashboard 300 provides a system operator with actuation indicators that can be used to perform various operations in the control system 102. In one or more embodiments, the control system 102 can be configured to present the dashboard 300 and output of the various modules (103,104,105,106,107) in the form of web pages that are accessible via a web browser operating in the control system 102.

In the illustrative embodiment of FIG. 3, the actuation indicators include an upload data actuator 301, a request labels actuator 302, a download cart CSV actuator 303, and an upload cart CSV actuator 304. The upload data actuator 301 is used to upload the customer upload profile via the data upload module (103) as described above. The request labels actuator 302 is used to select the customer and cart when a work order (109) is received via the request labels module (104). The download cart CSV actuator 303 is used to initiate transfer of the download file (115) to the cart (101) via the cart download module (105). The upload cart CSV actuator 304 is used to receive the upload file (117) from the cart (101) via the cart upload module (108).

For auditing purposes, one or more audit actuators are provided. In the illustrative embodiment of FIG. 3, the audit actuators include an upload audit CSV actuator 306, a download hand held CSV actuator 307, and an upload hand held CSV actuator 308. The upload audit CSV actuator 306 is used to upload the audit file (119) into the control system 102 via the audit module (107). The download hand held CSV actuator 307 is used to download the search file (120) from the control system 102 to the portable scanner (121) via the audit module (107). The upload hand held CSV actuator 308 is used to upload the scan file (122) from the portable scanner (121) via the audit module (107).

The illustrative dashboard 300 of FIG. 3 includes other features facilitating system operator control of the control system 102 as well. Reporting actuators include an audit results table actuator 309 for display results of the audit, and a print results table actuator 310 for presenting the print results table (118). As noted above, multiple carts can be active within the system. When a cart has been dispatched for a scanning job, its status can be displayed in a cart checked out status window 311.

Figure 4:
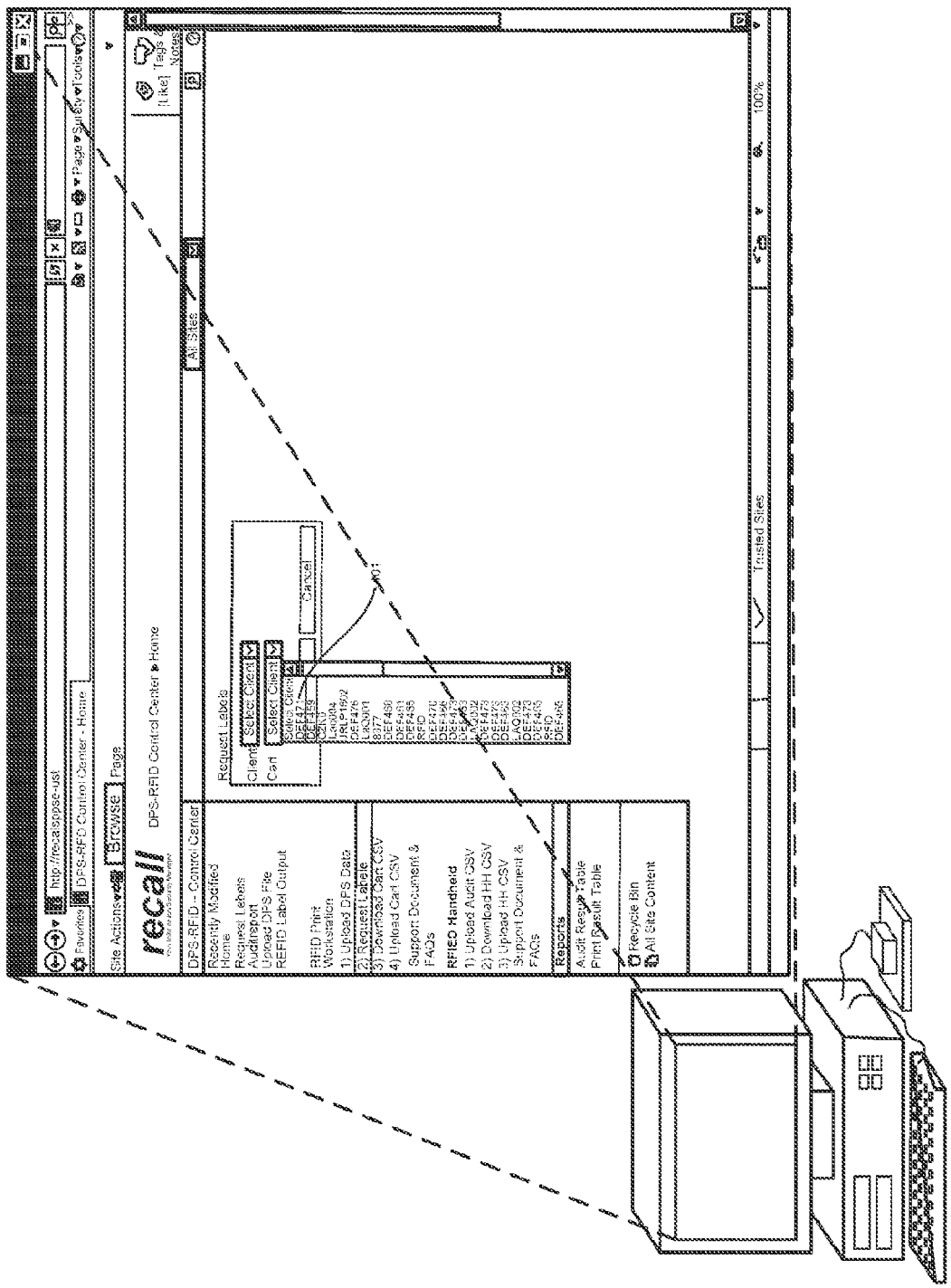
Figure 5:
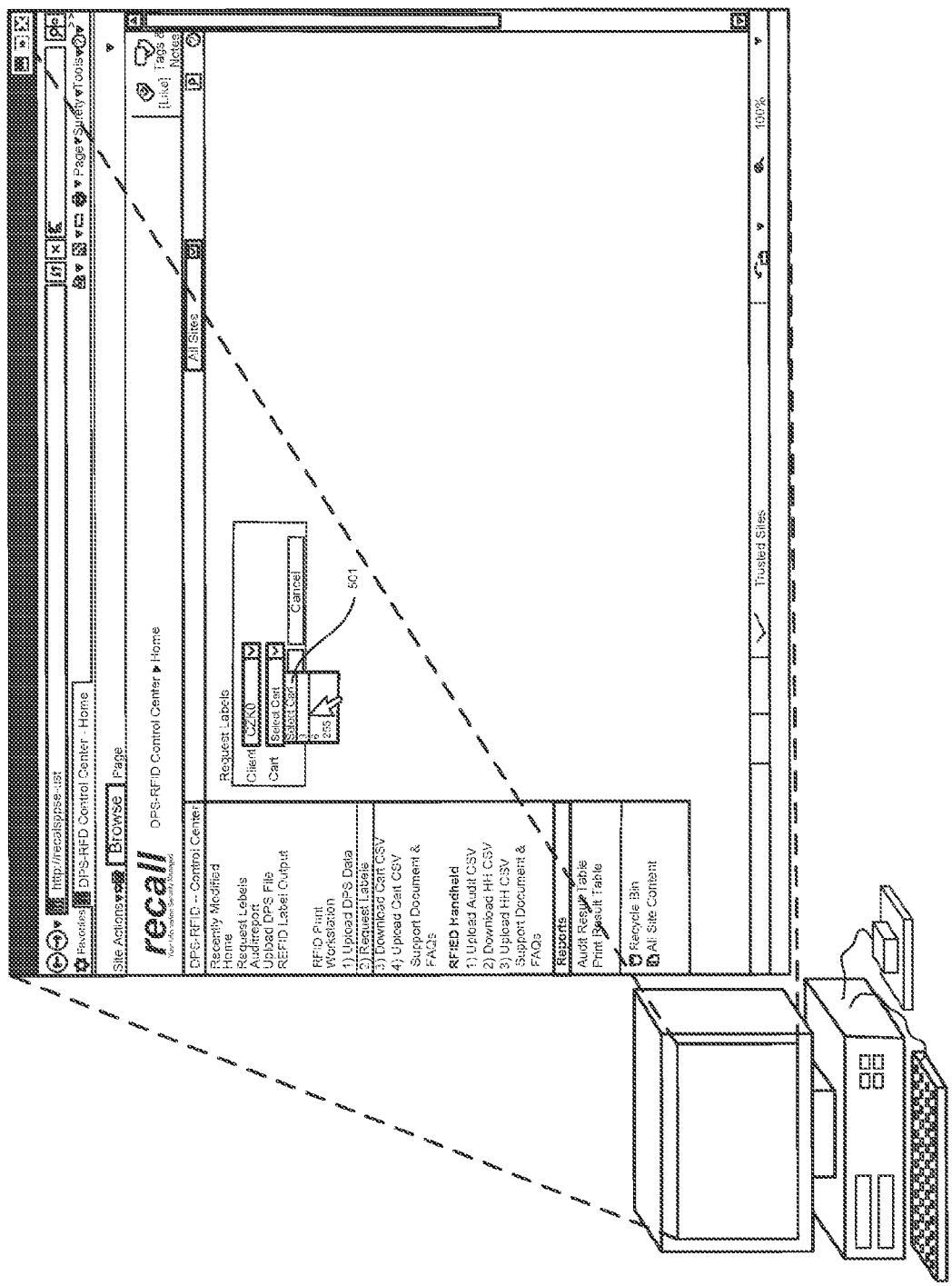

Once a work order (109) is received, presuming the customer upload profile is already stored in the control system, a system operator actuates the request labels actuator 302. Turning to FIG. 4, the request labels module (104) then permits the system operator to select a customer from a customer selection portal 401. Turning to FIG. 5, the request labels module (104) next permits the system operator to select a cart through a cart selection portal 501. In one embodiment, only available carts are presented in the cart selection portal 501. Said differently, if a cart has been dispatched to perform a label replacement operation, in one embodiment it will not be available for selection in the cart selection portal 501.

Figure 6:
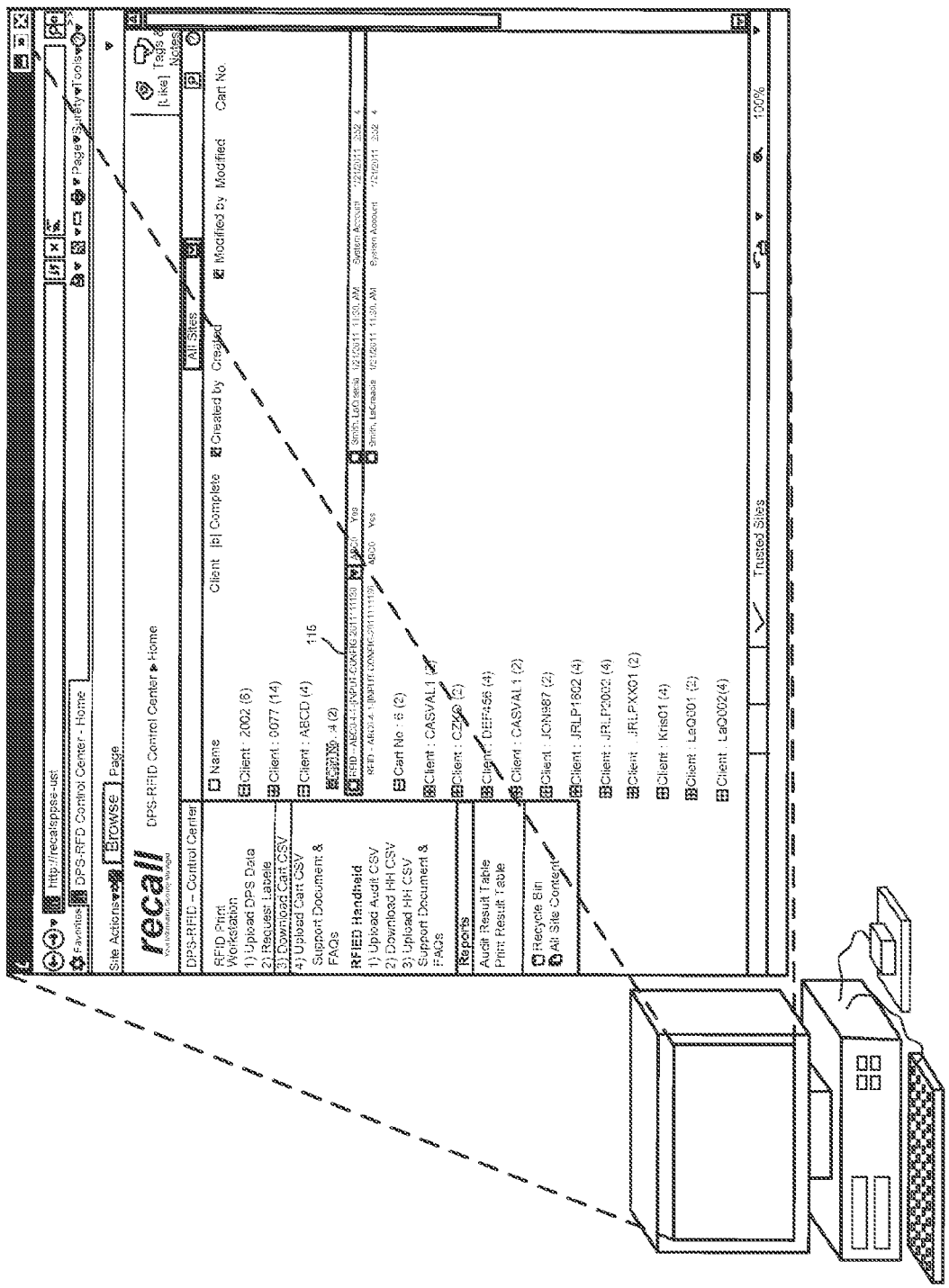
Figure 7:
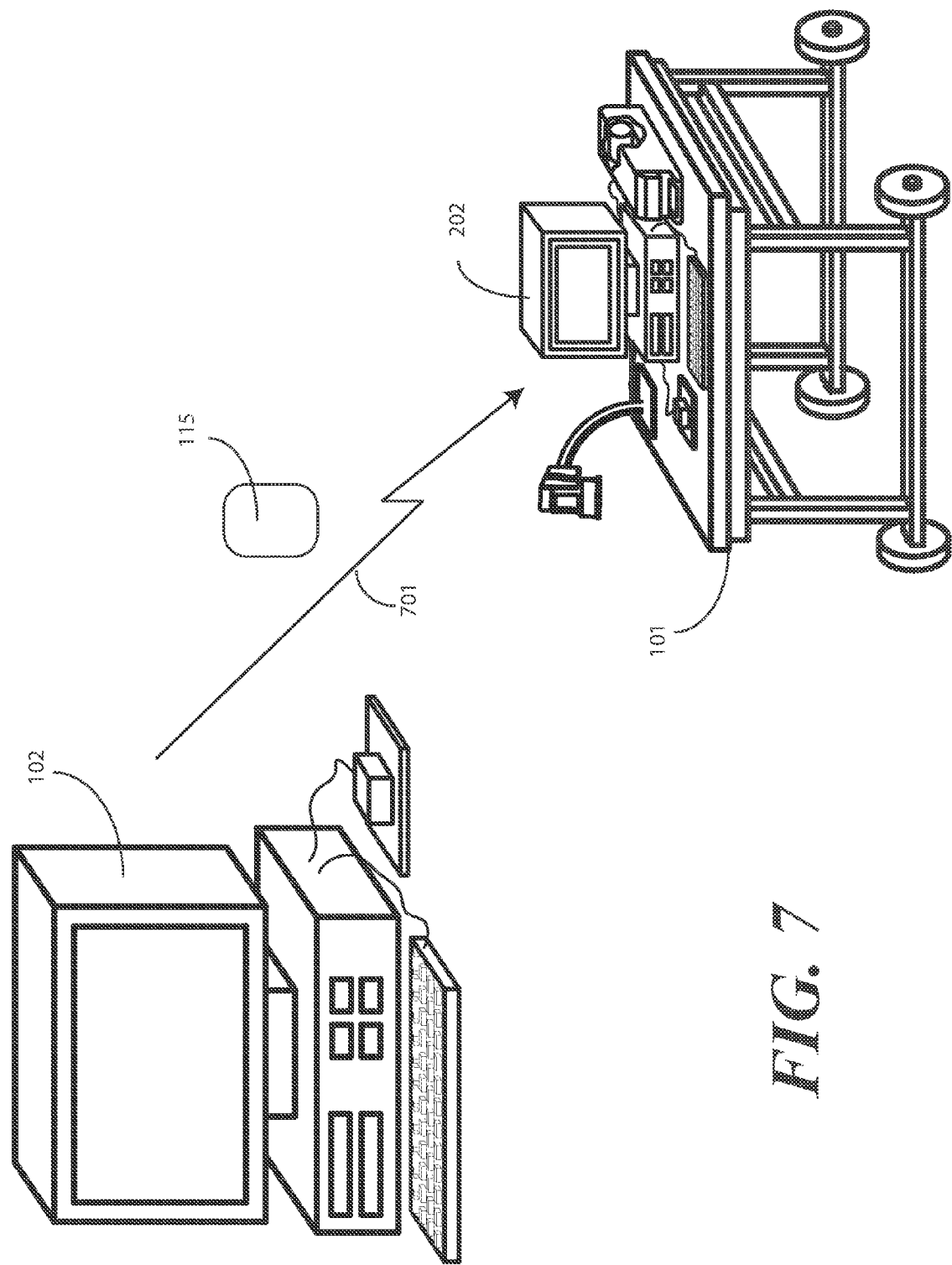

Once these steps are complete, the cart download module (105) then creates the download file 115, a listing of which is presented to the system operator on a display 601 of the control module as shown in FIG. 6. As noted above, in one embodiment the download file 115 is a comma separated value file that includes a plurality of allowed print values from which the control device (202) attached to the cart (101) can select for assignment to the RFID labels (112). The client identifier, cart identifier, and other information can also be included in the download file 115, as can a desired set of print values that are based upon the work order (109). Turning to FIG. 7, once the download file 115 is created, the cart download module (105) of the control system 102 transmits 701 the download file 115 to the control device 202 of the cart 101.

Figure 8:
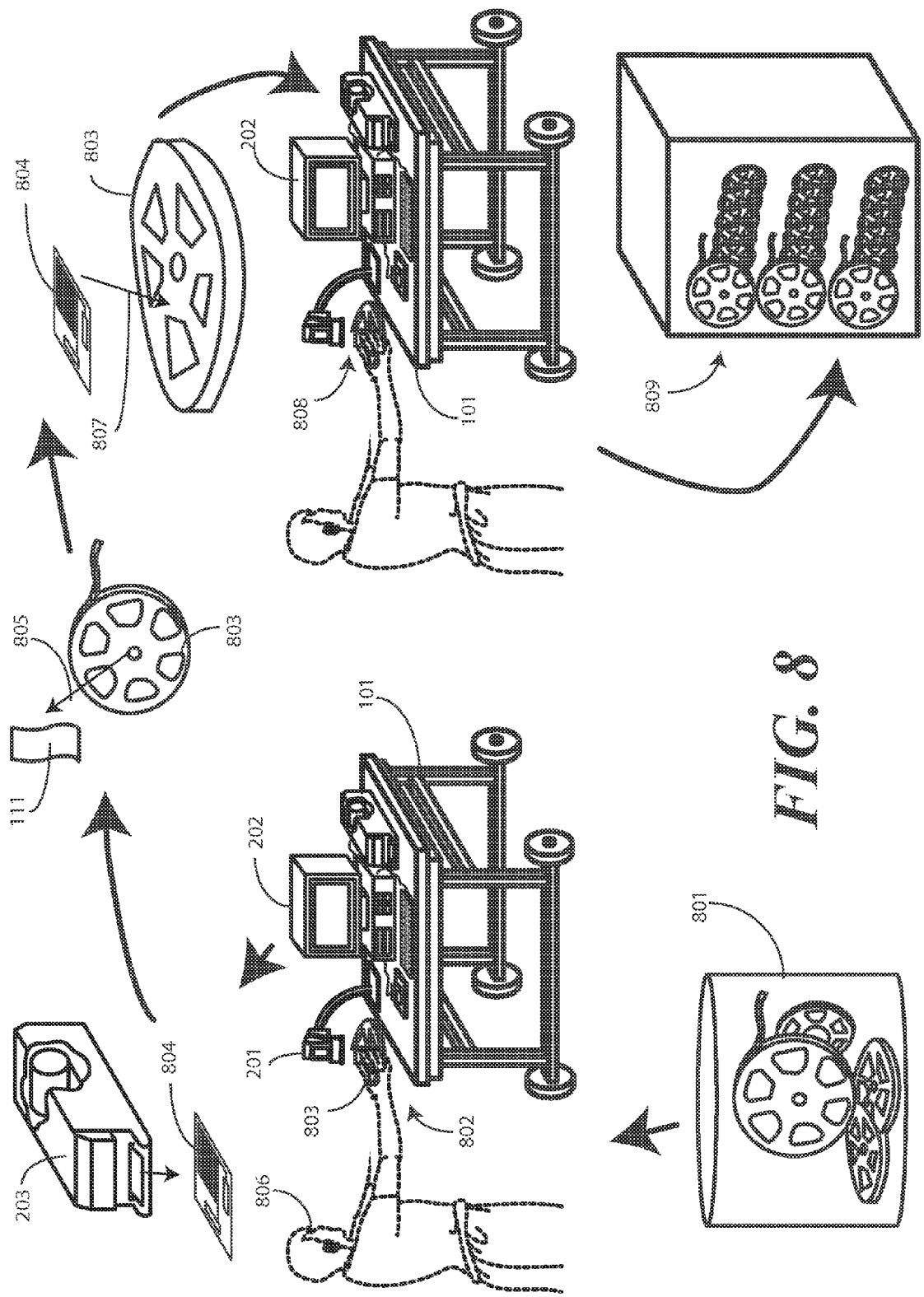
FIG. 8 illustrates one method of archiving media in accordance with one or more embodiments of the invention.

Turning now to FIG. 8, illustrated therein are the steps of a method of archiving media with the cart 101 once the download file (115) has been received. A plurality of media items, which are recited in the work order (109) are first received. Next, on a one-by-one basis, an operator 806 scans 802, with the scanning device 201 of the cart 101, a bar code label attached to one 803 of the plurality of media items 801.

The control device 202 then creates with the RFID label printer 203 a unique encoded RFID label 804 corresponding to the bar code label scanned by the scanning device 201. As noted above, in one embodiment the unique encoded RFID label 804 includes a data field (204) that includes a cart identifier (205) that is unique to the cart 101 to which the scanning device 201 and the RFID label printer 203 are attached and a serial number (206). In one embodiment, each of the plurality of media items 801 is assigned a unique, sequential serial number.

Recall from above that in one embodiment, a conventional printer and an associated RFID device configured to read, write, lock, etc. RFID codes. In such an embodiment, the conventional printer would print on an RFID label, but would not encode the label. Encoding would be done in a subsequent step by the associated RFID device.

The operator 806, or a machine, then removes 805 the non-RFID label 111 from the media item 803. Thereafter, the operator 806 or machine attaches 807 attaching the unique encoded RFID label 804 to the media item 803 where the non-RFID label 111 was previously located. The operator 803 can then optionally scan 808 the unique encoded RFID label 804 to confirm the cart identifier (205) and the serial number (206) are in the data field (204) applied to the unique encoded RFID label 804. The data field (204) and corresponding information can then be stored in the control device 202 of the cart 101. In one or more embodiments, the data field (204) can be associated with a customer identifier in the control device 202 as well. The media item 803 can then be archived 809. The steps of scanning, creating the RFID label, removing the non-RFID label, attaching the RFID label, and rescanning the RFID label can then be repeated with another of the plurality of media items 801 until each has had its label replaced.

Figure 9:
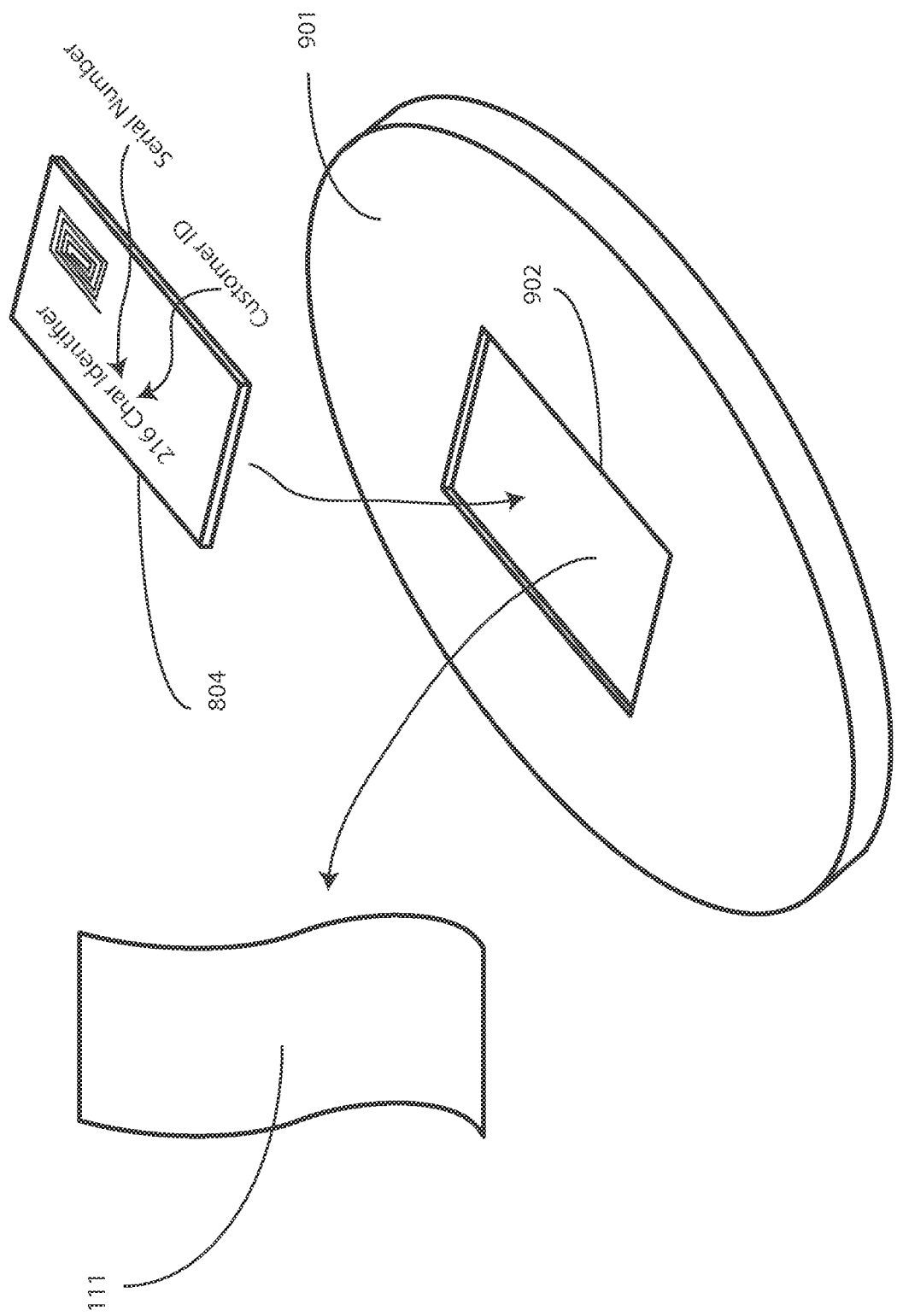
FIG. 9 illustrates a media item during label replacement in accordance with one or more embodiments of the invention.

As shown in FIG. 9, in one or more embodiments the unique encoded RFID label 804 is configured to be attachable to a media item, such as the magnetic tape media 901 shown, without affecting operation of the magnetic tape media 901 in a magnetic tape media player. For example, some magnetic tape media 901 will include a recess 902 just sufficient for a single label. For this reason, the non-RFID label 111 must be removed before the unique encoded RFID label 804 is attached. Due to this requirement, the steps of FIG. 8 are executed in one embodiment on a one-by-one basis to prevent mislabeling one of the media items.

Figure 10:
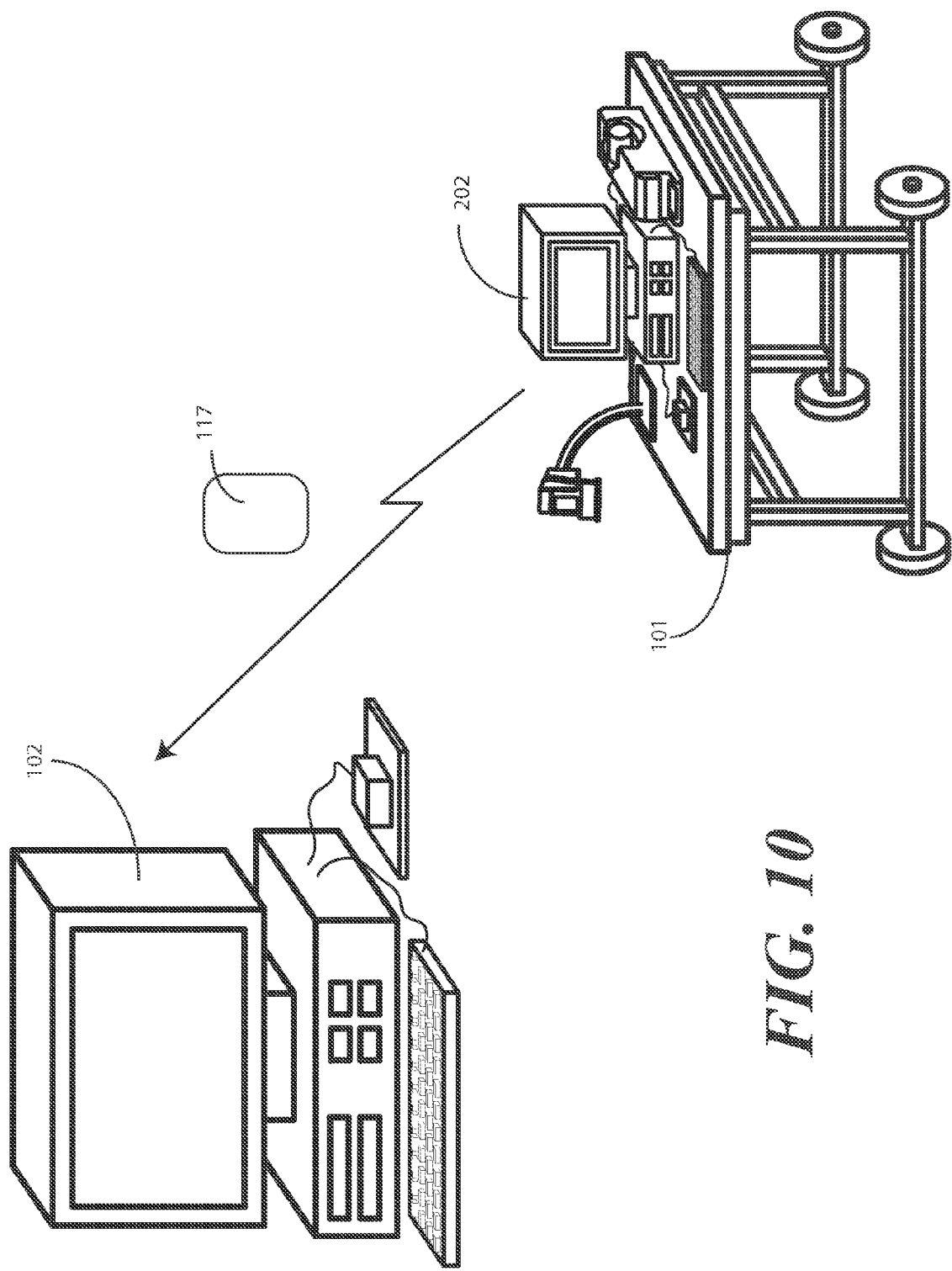
FIG. 10 illustrates apparatus components performing a method of uploading a plurality of unique encoded RFID label data fields each comprising the unique cart identifier and a serial number in accordance with one or more embodiments of the invention.
Figure 11:
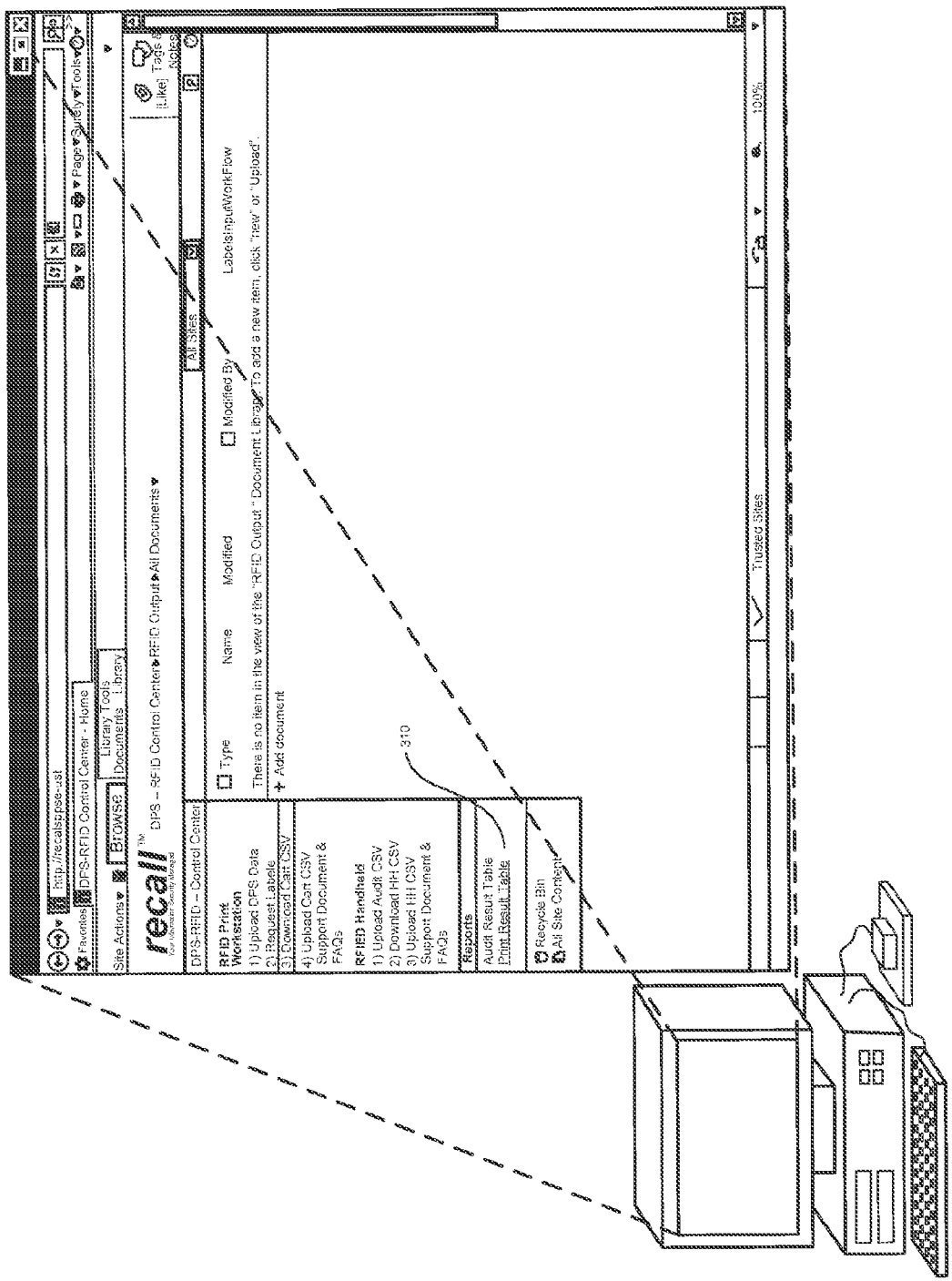

Turning to FIG. 10, once the cart activities are complete, the upload file 117 is delivered from the control device 202 of the cart 101 to the cart upload module (106) operable within the control system 102. The upload file 117 is then processed by the control system 102 to integrate the data therein into the system. The upload file 117 can include stored data fields corresponding to the plurality of media items (801) that had non-RFID labels (111) replaced with the unique encoded RFID labels (804) in the process of FIG. 8. Once integrated into the print results table, as shown in FIG. 11, a system operator can actuate the print results table actuator 310 to initiate presentation of the print results table (118).

Figure 12:
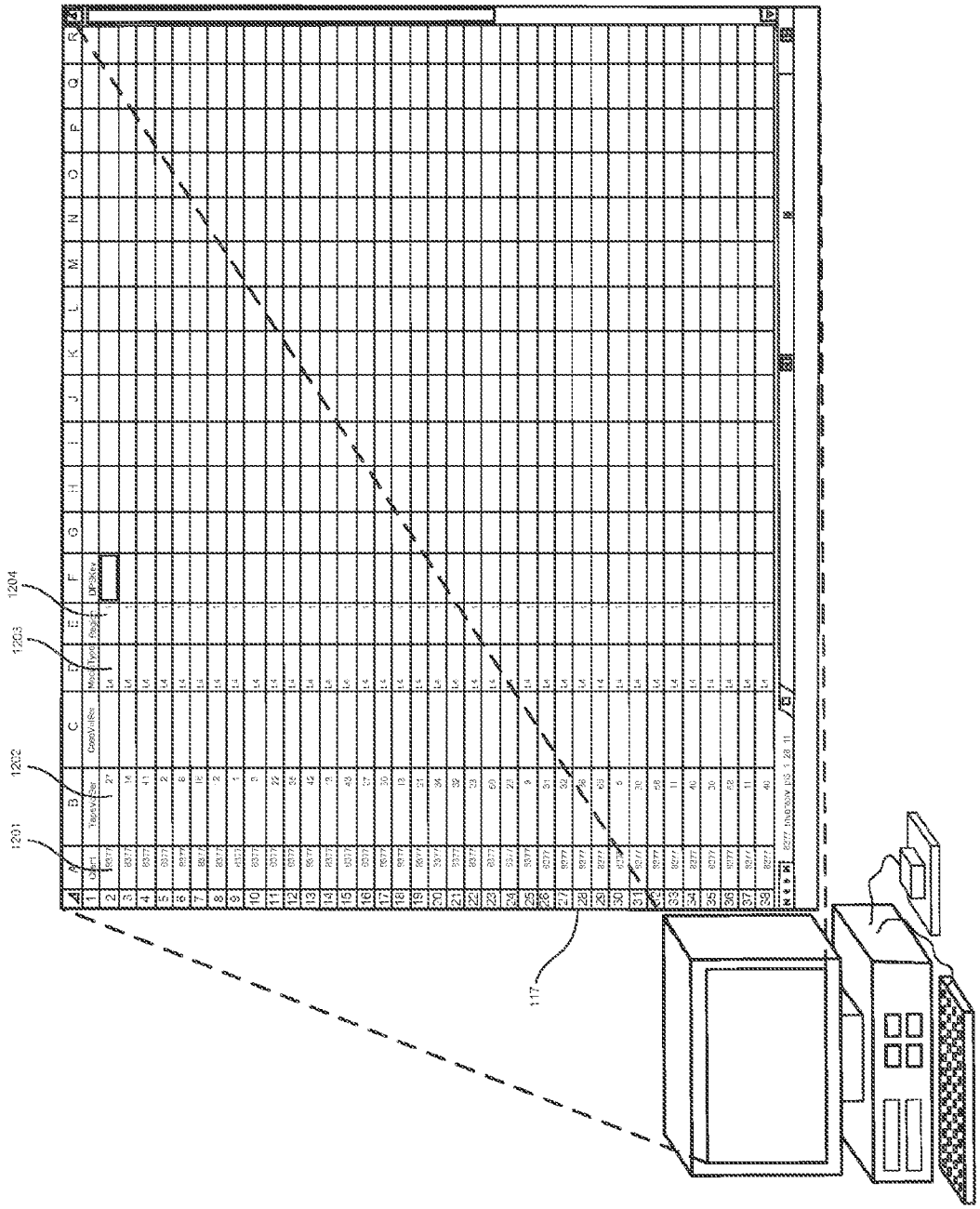

One example of an upload file 117 is shown in FIG. 12. In this illustrative embodiment, the upload file 117 includes a client number 1201 that identifies the client owning the media items. A TapeVolSer 1202 is a field that can be populated with the customer's identification number. A media type field 1203 identifies what type of media item was labeled. A DPS Key is 1204 is a primary key that can be used for sorting the items in the print results table 118.

As noted above, in one or more embodiments, it is useful to audit the media archival system to ensure that all procedures related to archival and/or removal of non-RFID labels and replacement with RFID labels has occurred properly. Turning now to FIGS. 13-16, illustrated therein are steps of one method for auditing in accordance with one or more embodiments of the invention.

Figure 13:
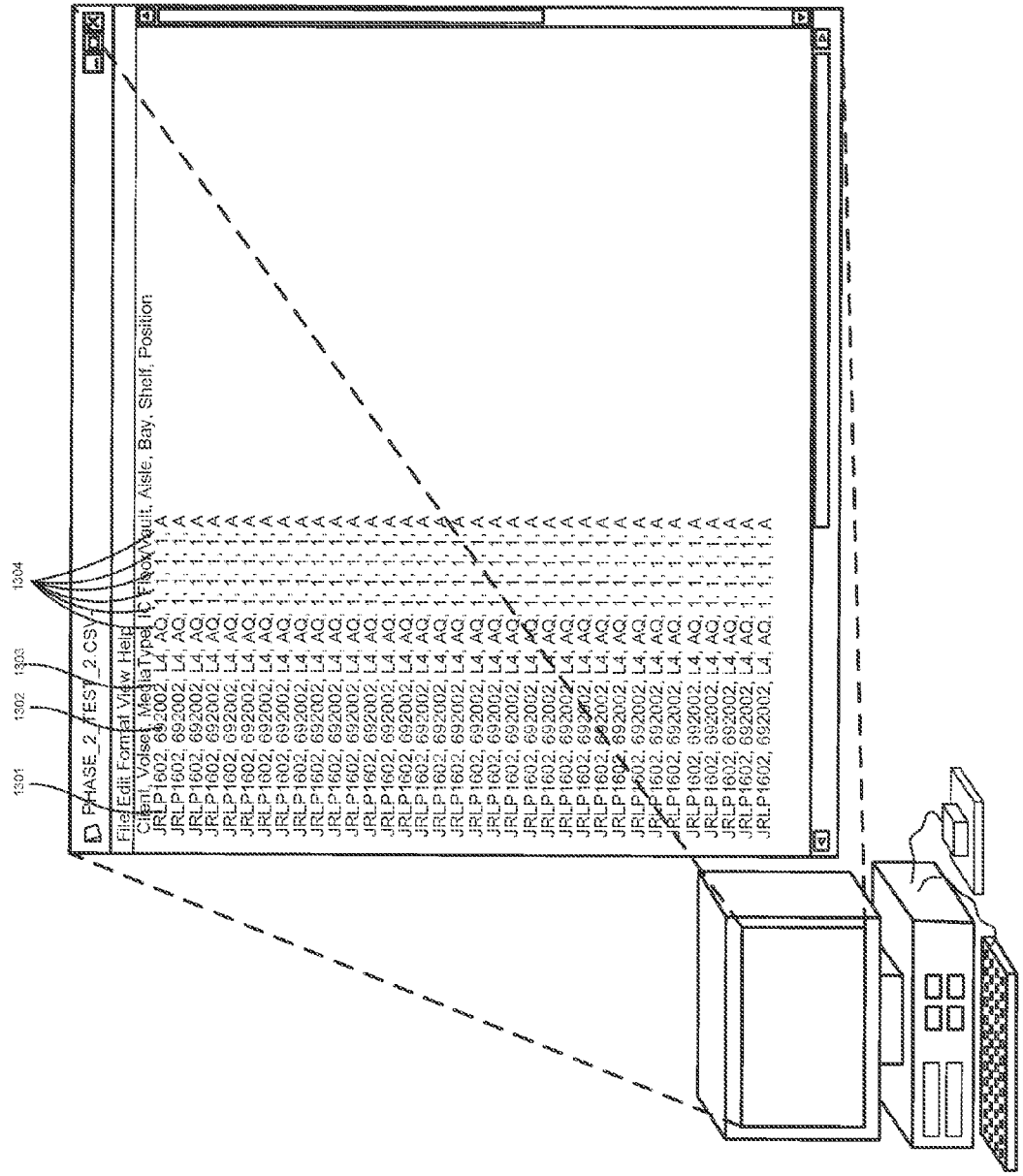

Beginning with FIG. 13, illustrated therein is an audit file 119 that can be created with an audit module (107) of the control system 102. The audit file 119 includes a plurality of identifiers corresponding to stored media items. In one embodiment, each identifier of the audit file 119 includes customer indicia 1301 identifying a customer, volume indicia 1302 that can be populated with customer identifying information, media type indicia 1303 identifying a type of media item to be audited, and location indicia 1304 indicating a storage location within the media item archival system. Once created, the audit module (107) uploads the audit file 119 to the control system 102.

Figure 14:
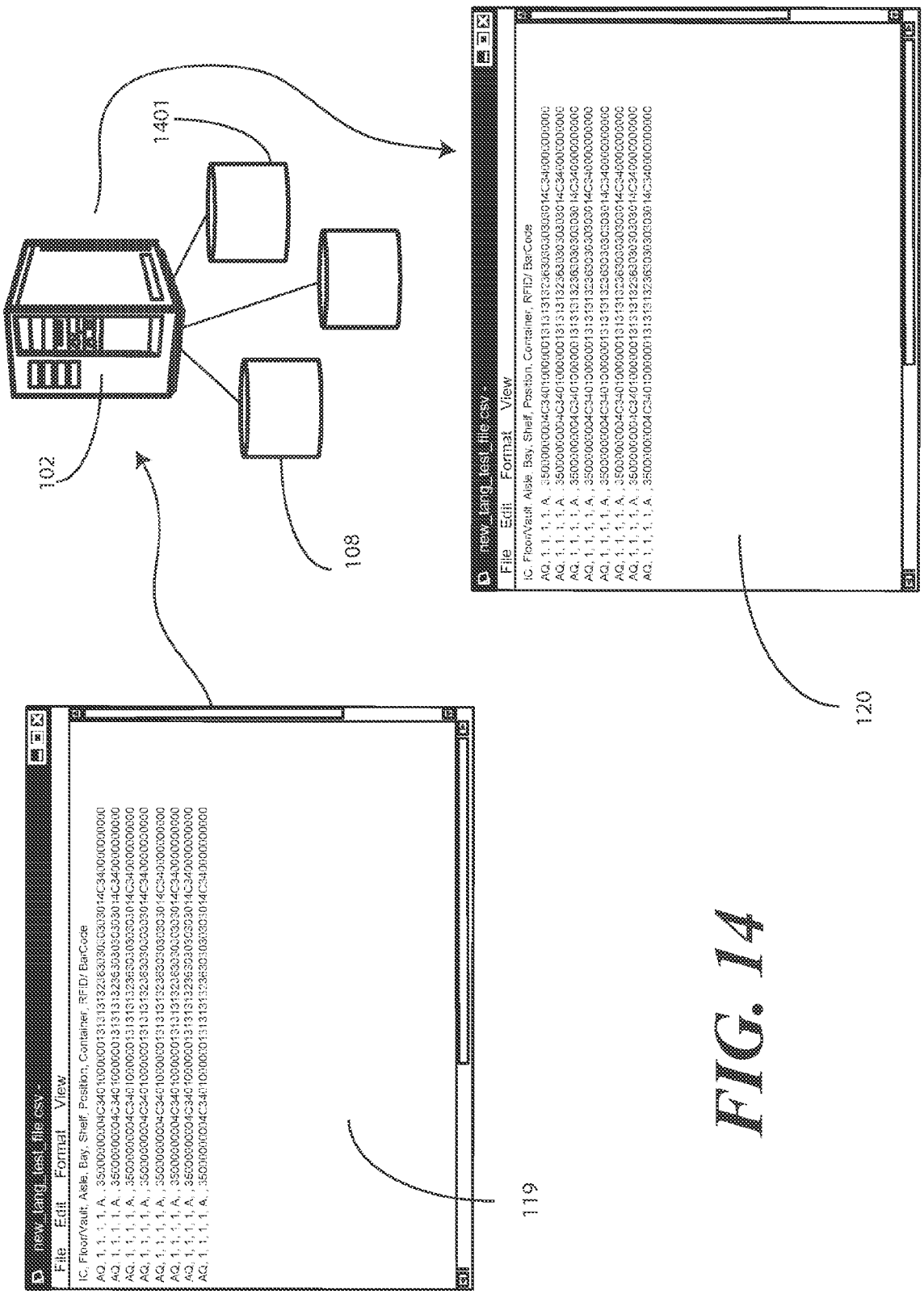

Turning to FIG. 14, in one embodiment, the audit module (107) can then associate the identifiers from the audit file 119 with one or more data fields stored in the database 108. The database fields, in one embodiment, are data fields that are printed on RFID labels 112 of single individual media items in storage (114). For example, when the audit file 119 is created, it can include information relating to customer number, media type, and where each media item is stored within the system. An operator can employ the control system 102 to select the desired audit items and export them to the control system 102.

The control system 102, or the audit module (107) of the control system 102, takes the audit file 119 and processes it by taking the combination of the cart identifier (205) plus the serial number (206) and using that combination as the unique key to extract the fully encoded data field (204) from an operational system 1401 to form the resulting search file 120. Because the data field (204) is not a part of the operational system 1401, an audit file 119 is not pulled directly from the operational system 1401. Instead, in one embodiment, a two-step process is employed. The audit module (107) employs the client identifier (205) and volume serial number (206) as a key to generate the search file 120. In short, the audit module (106) takes the location indicia (1304) from the audit file 119 and passes it to the search file 120, while replacing the client identifier (205) and volume serial number (206) with fully encoded data field (204).

Figure 15:
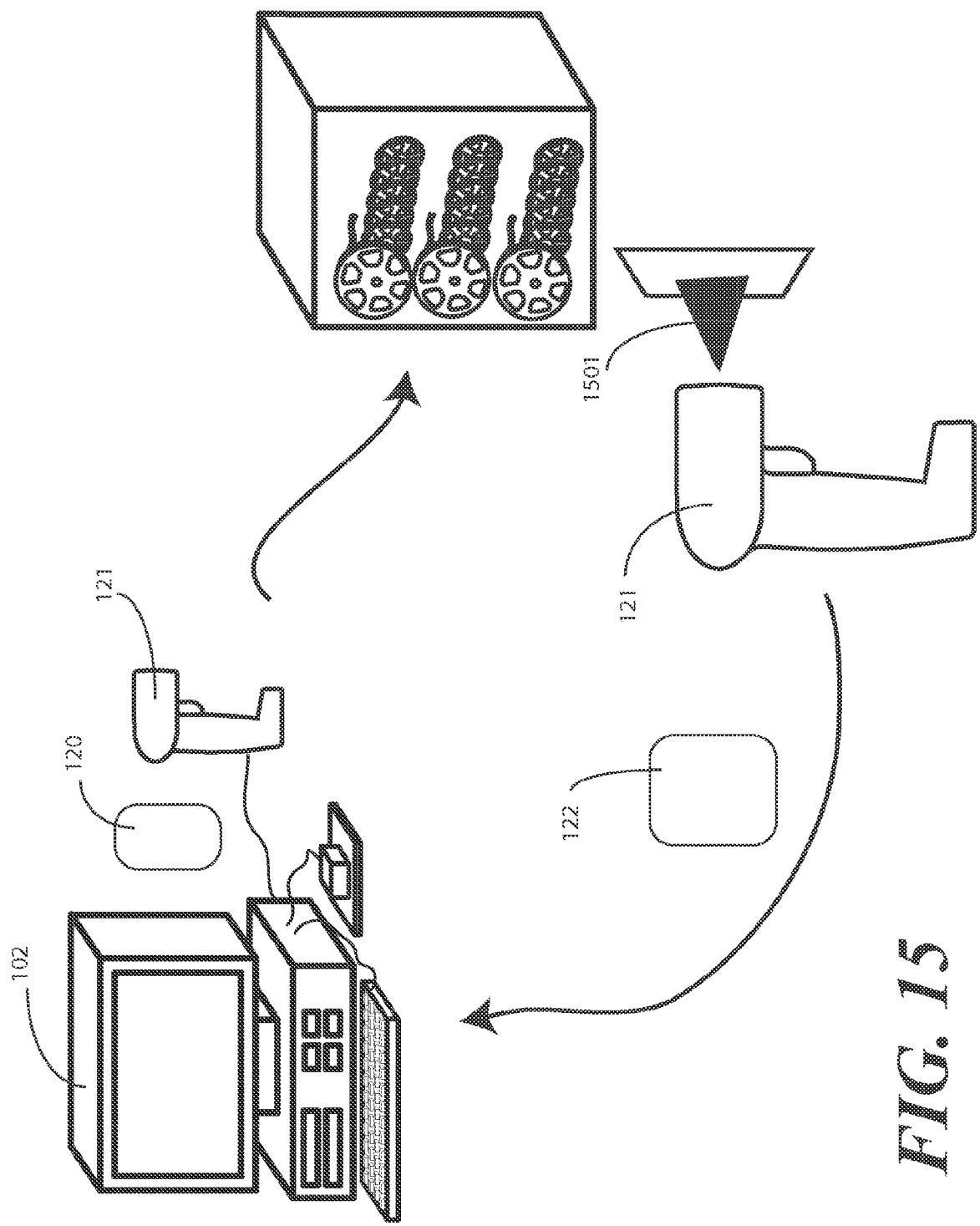

Once this is complete, turning now to FIG. 15, the audit module (107) of the control system 102 downloads the search file 120 into a portable scanner 121. The portable scanner 121 can be used to scan 1501 the RFID-readable media items in storage to ensure each is stored in accordance with the data in the audit file (119). Once this scanning is complete, the audit module (107) can receive a scan file 122 and upload it into the control system 102 from the portable scanner 121. In one embodiment, the scan file 122 can be used to indicate whether each item listed in the audit file 119 was found in the media item archival system in accordance with the data stored in the database (108).

Figure 16:
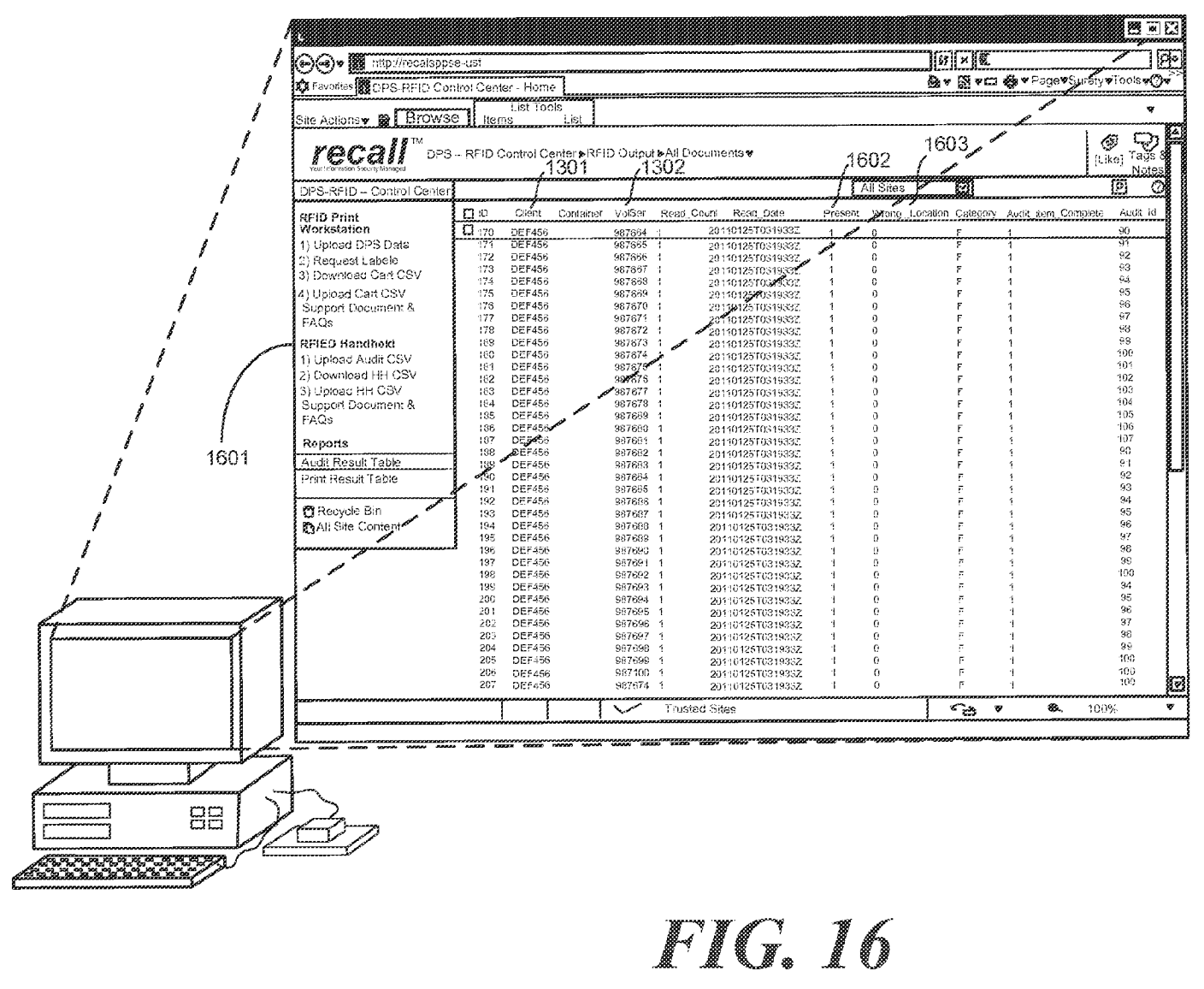

Turning to FIG. 16, illustrated therein is an audit results display 1601. In addition to the customer indicia 1301 and volume indicia 1302 from FIG. 13, the audit results display 1601 indicates whether the media item was present in column 1602. If the media was not present, this is indicated in column 1603.

Figure 17:
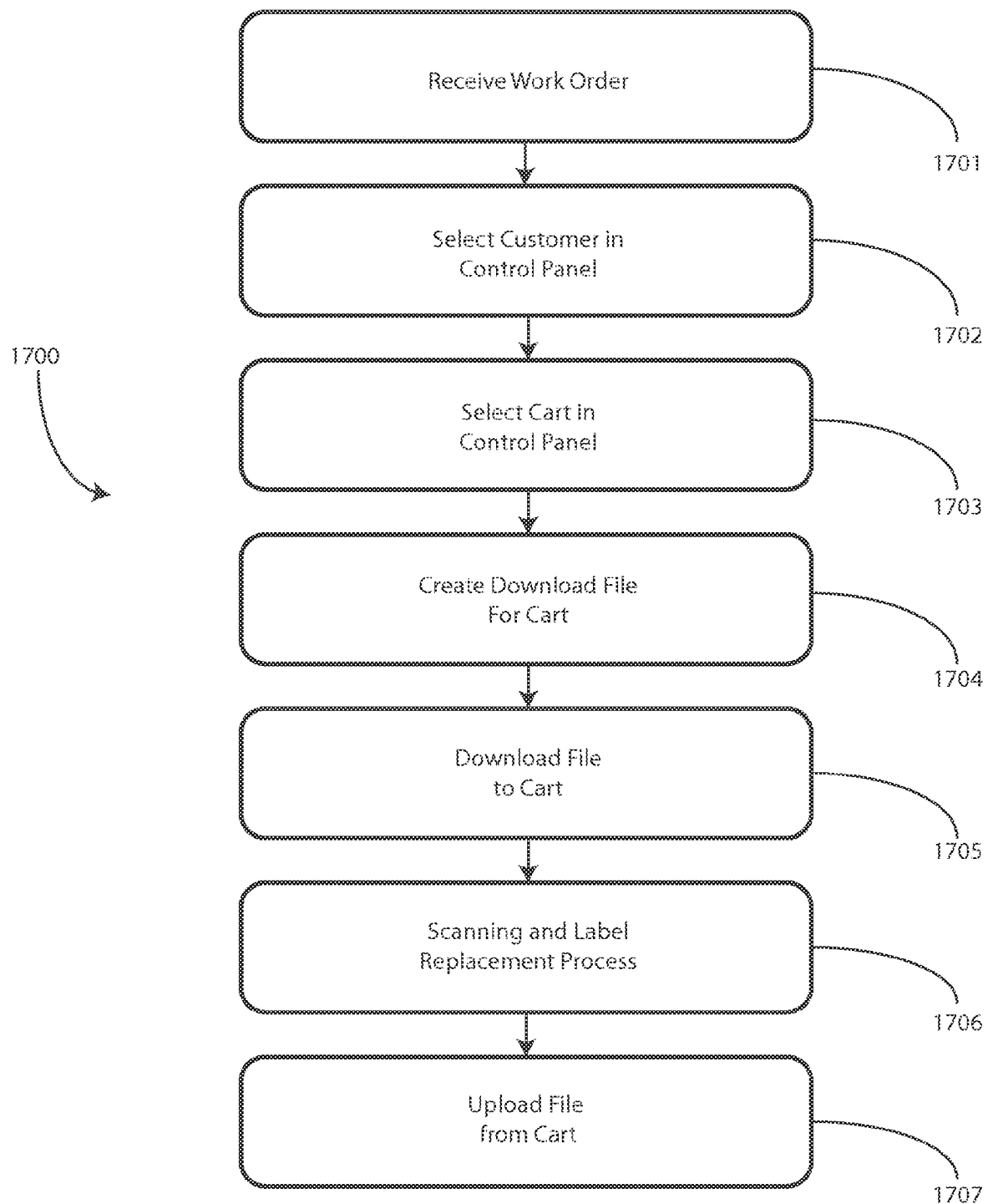
FIGS. 17-18 illustrate a method of archiving media items in a media archival system in accordance with one or more embodiments of the invention.

Turning now to FIG. 17, illustrated therein is one method 1700, shown in flow-chart form, for archiving media in accordance with one or more embodiments of the invention. At step 1701, the method 1700 receives a work order (109) indicating that a plurality of media items is to be archived in an archival system. In one embodiment, the work order (109) includes a list of a plurality of media items to be archived.

At step 1702, a customer identifier corresponding to the customer indicated in the work order (109) is selected with the assistance of a request labels module (104). At step 1703, a cart (101) having a unique cart identifier is selected with the assistance of the request labels module (104).

At step 1704, a cart download module (105) creates a download file (115) to be sent to the cart (101). In one embodiment, the download file 9115) is based in part from the work order (109) received at step 1701. In one embodiment, the cart download file (115) includes a plurality of allowed print values, each of the plurality of allowed print values comprising the unique cart identifier. At step 1705, the download file (115) is downloaded to a control device (202) of the cart (101).

Figure 18:
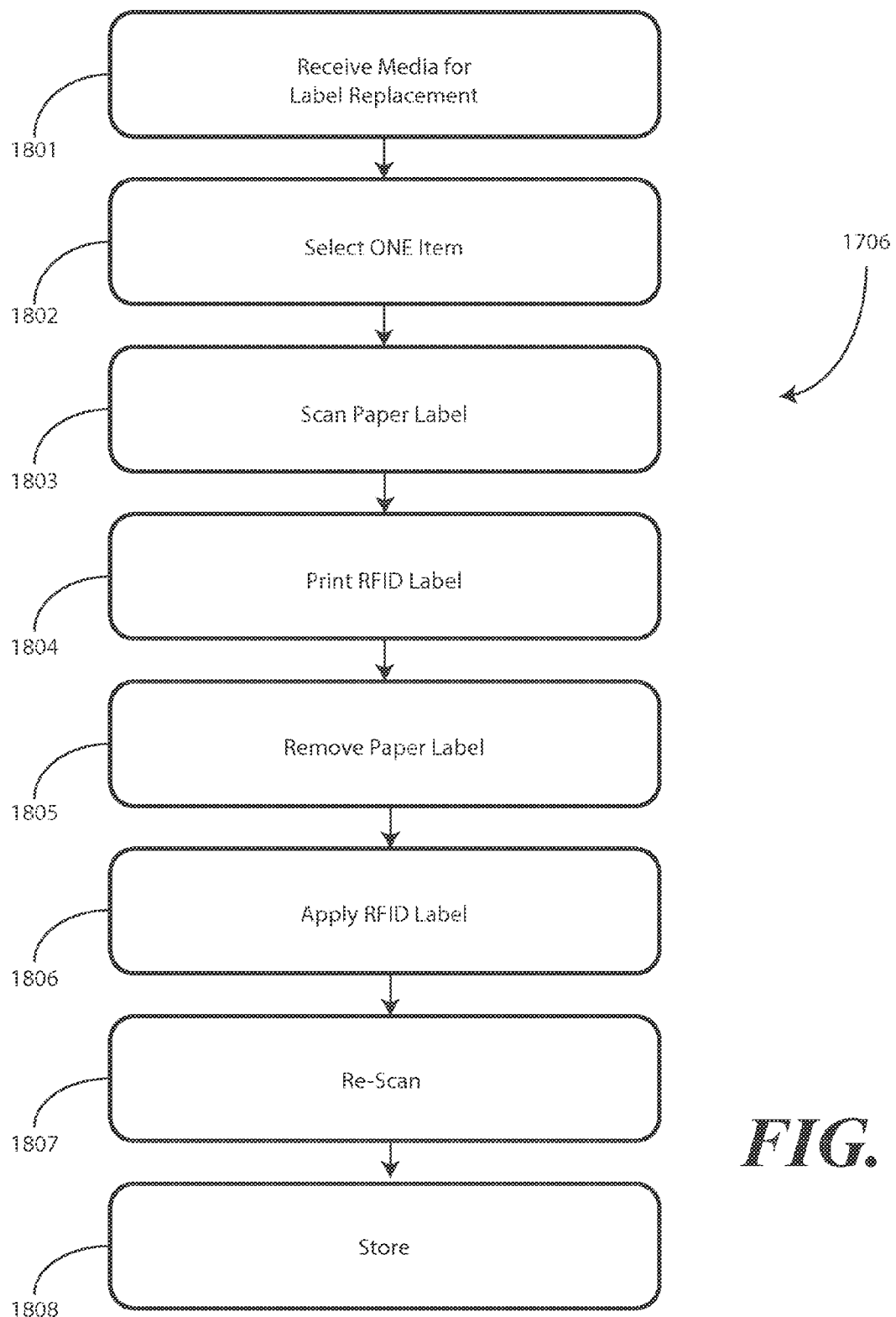

At step 1706, the scanning, removal of old labels, printing of new, RFID labels, and attachment of the RFID labels occurs. This step 1706 is shown in more detail in FIG. 18. Turning now to FIG. 18, at step 1801, a plurality of media items listed in the work order (109) are received. At step 1802, a single item is selected from the plurality of media items. At step 1803, a non-RFID label (111) is scanned with a scanning device (201) on a cart (101).

At step 1804, an RFID label 112 is created with an RFID label printer (203) on the cart (101). The RFID label is uniquely encoded in that it corresponds to the information read from the non-RFID label (111), and includes a data field (216) having a cart identifier (205) that is uniquely assigned to the cart (101) and a serial number (206) corresponding to the media item integrated into the data field (204).

At step 1805, the non-RFID label (111) is removed from the media item. At step 1806, the RFID label (112) is attached to the media item where the non-RFID label (111) used to be located. This is done so that, in the case of magnetic tape media, the placement of the RFID label (112) will not affect the operation of the magnetic tape media in a magnetic tape media player.

At step 1807, the RFID label (112) is re-scanned to confirm that the encoded information on the label corresponds to the information read from the non-RFID label (111), and includes a data field (216) having a cart identifier (205) that is uniquely assigned to the cart (101) and a serial number (206) corresponding to the media item integrated into the data field (204). At step 1808, the media item is stored in the media archival system.

Returning to FIG. 17, at step 1707, a cart upload module (106) receives an upload file (117) from the cart (101). In one embodiment, the upload file (117) is then processed by the control system (102) to integrate the data therein into the system. The upload file (117), or data therefrom, can then be presented to the system operator in a print results table (118).

The embodiments described above provide apparatus components and method steps for safely and reliably replacing non-RFID labels on media items with RFID labels without the risk of inadvertently mislabeling or otherwise mishandling media items. The embodiments described herein offer advantages over prior art systems in that they provide a robust system that is immune from user error. The embodiments above facilitate efficient, cost effective transformation of non-RFID labeled items into RFID labeled items that can be accurately retrieved as necessary.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A cart, comprising:
    a scanning device configured to read both bar code labels and radio frequency identification (RFID) labels;
    a control device, operable with the scanning device, to receive scanned data from the scanning device, the scanned data comprising information read from either the bar code labels or the RFID labels; and
    an RFID label printer, operable with the control device;
    the control device to print a unique encoded RFID label on a one-to-one basis for each bar code label read by the scanning device, the unique encoded RFID label comprising a data field applied by the RFID label printer comprising:
        a cart identifier; and
        a serial number.

2. The cart of claim 1, wherein the data field is 28 bits in length.

3. The cart of claim 1, wherein the cart identifier is three characters in length.

4. The cart of claim 3, wherein the serial number is six characters in length.

5. The cart of claim 4, wherein the data field is 216 bits in length.

6. The cart of claim 1, wherein each of the scanning device, the control device, and the RFID label printer are fixedly attached to the cart.

7. The cart of claim 1, wherein the unique encoded RFID label is configured to be attachable to magnetic tape media without affecting operation of the magnetic tape media in a magnetic tape media player.

8. The cart of claim 1, the control device to confirm the cart identifier and the serial number are in the data field.

9. The cart of claim 1, the control device to store the data field.

10. The cart of claim 1, the control device to associate the data field with a customer identifier.

11. The cart of claim 1, the control device to deliver stored data fields corresponding to the RFID labels to a control system.

12. The cart of claim 1, the control device to auditing the RFID labels by rescanning, with the scanning device, at least one of the one of the RFID labels to confirm archival of the same.

13. The cart of claim 1, the control device to receive a download file comprising a plurality of allowed data fields, each of the plurality of allowed data fields being associated with a predefined customer identifier.

* * * * *